Dec. 21, 1937.   L. S. BROWN   2,103,143
DIFFERENTIAL GEAR
Filed Sept. 21, 1936

Laverne S. Brown,
INVENTOR
BY Victor J. Evans & Co.
ATTORNEYS

UNITED STATES PATENT OFFICE 2,103,143

DIFFERENTIAL GEAR

Laverne S. Brown, Gaines, Pa.

Application September 21, 1936, Serial No. 101,874

2 Claims. (Cl. 74—315)

This invention relates to differential gears and has for an object to provide a differential gear which will allow one wheel of the motor vehicle to spin only a certain length of its circumference before it will apply power to the other wheel so that a motor vehicle may have one drive wheel out of traction contact with the roadway and still be capable of forward movement.

A further object is to provide a differential gear of this type which is substantially simpler than similar differential gears and is constructed of less parts than is customary, this being accomplished by the provision of built-in overrunning clutches instead of friction clutches for connecting the countershaft gears to the countershaft.

A further object is to provide a differential gear of this type in which the countershaft drive gear is clutched to the countershaft so as to permit it to be manually declutched from the countershaft to permit the gear assembly to be reversed in direction of rotation.

A further object is to provide a differential gear of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
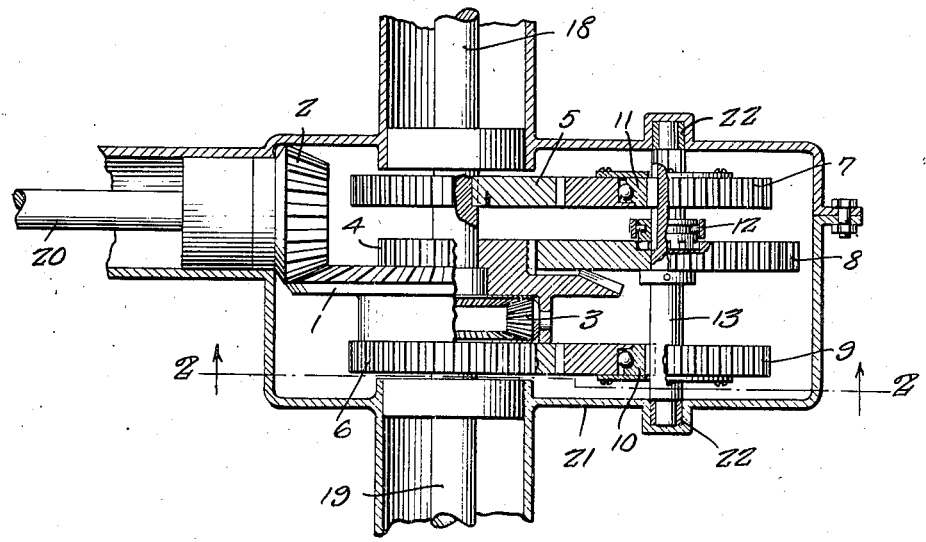
Figure 1 is a cross sectional view of a differential gear constructed in accordance with the invention.
Figure 2:
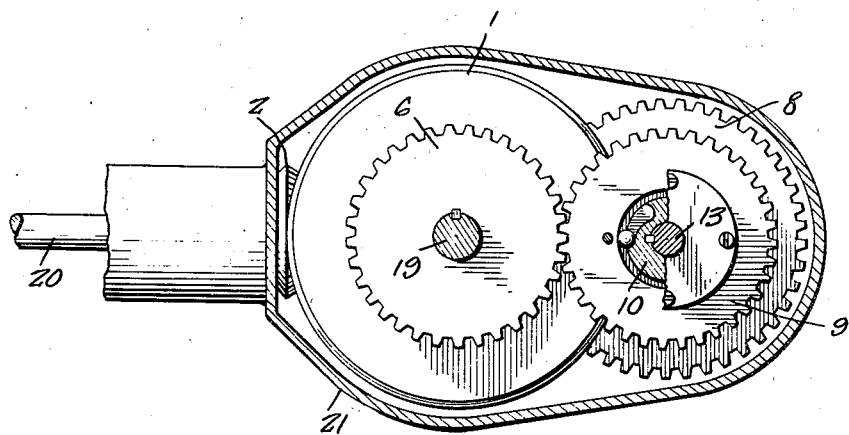
Figure 2 is a longitudinal sectional view taken on the line 2—2 of Figure 1.

Referring now to the drawing in which like characters of reference designate similar parts in the various views, 1 designates a ring gear which is driven by a ring gear pinion 2 on the propeller shaft 20 and drives a conventional differential assembly 3. A gear 4 is formed integral with the ring gear. A gear 5 is splined to the right axle 18 and a gear 6 is splined to the left axle 19.

A countershaft gear 7 is connected to a countershaft 13 through the medium of a built-in over-running clutch 11. The gear 7 meshes with the gear 5 of the axle 18. The countershaft drive gear 8 meshes with the gear 4 carried by the ring gear and is loose on the countershaft. For clutching the gear 8 to the countershaft a conventional clutch collar 12 is splined on the shaft so that its toothed face may be engaged with the similar toothed face of the gear 8.

A countershaft gear 9 meshes with the gear 6 of the axle 19 and is connected to the countershaft through the medium of a built-in overrunning clutch 10.

The differential gear assembly is enclosed in a housing 21 having bearings 22 for the ends of the countershaft.

In operation, should the drive wheel on the axle 18 spin, the gear 6 will cause the gear 9 on the countershaft to be so reduced in speed as to permit the countershaft to engage, by means of the over-running clutch 10, the gear 9. Power is then delivered to the axle 19 through the following parts, gear 4, gear 8, countershaft 13, over-running clutch 10, gear 9, and gear 6, to the axle 19 which is the stalled drive member requiring power.

Gear 7 will not be receiving power because spinning of the axle 18 and gear 5 will cause the gear 7 to be revolved faster than the countershaft and thus the over-running clutch mechanism 11 cannot clutch the gear to the countershaft. This is true because of the difference in gearing ratio between the gears 4 and 8, 5 and 7, and 6 and 9.

When the vehicle is in forward motion the gears 7 and 9 will be at all times revolving faster than the countershaft. The reason for this is to permit one or the other of the axles and drive wheels to revolve freely a certain distance of its circumference more than its companion wheel in order to negotiate turns in the roadway.

The countershaft will always increase its speed in relation to the gearing on the side of the slower revolving axle to such an extent as to equal that of the gears 7 or 9 as the case may be, so that both drive wheels must deliver power. Although one drive wheel may revolve faster than the other it cannot revolve faster than the predetermined difference in gear ratio of the differential 3.

When the differential gear is to be reversed in direction of rotation the gear 8 must be declutched from the countershaft 13. This is not detrimental to the effective operation of the device but on the contrary is very important because when a vehicle is stalled on an incline, for example, the gear 8 will lock the transmission so that the vehicle cannot drift backwards.

From the above description it is thought that the construction and operation of the invention will be fully understood without further explanation.

What is claimed is:

1. The combination with a differential gear and a pair of alined axles driven thereby, of gears on the axles on opposite sides of the differential, a gear integral with the ring gear, a countershaft, countershaft gears meshing with the gears on the axles, over-running clutches connecting the countershaft gears with the countershaft, and a gear on the countershaft meshing with the gear carried by the ring gear.

2. The combination with a differential gear and a pair of aligned axles driven thereby, of gears on the axles on opposite sides of the differential, a gear integral with the ring gear, a countershaft, countershaft gears meshing with the gears on the axles, over-running clutches connecting the countershaft gears with the countershaft, a gear loose on the countershaft and meshing with the gear carried by the ring gear, and a shiftable clutch device connecting the last named gear with the countershaft.

LAVERNE S. BROWN.